United States Patent [19]

Bouiller et al.

[11] Patent Number: 4,546,606

[45] Date of Patent: Oct. 15, 1985

[54] PRESSURE DROP REGULATING DEVICE

[75] Inventors: Jean G. Bouiller, Brunnoy; Marc F. B. Buisson, Le Meé sur Seine; Gerard E. A. Jourdain, Saintry sur Seine; Denis J. M. Sandelis, Nangis; Yves R. A. Urruty, Melun, all of France

[73] Assignee: Societe Nationale d'Etude et de Construction de Moteurs d'Aviation, Paris, France

[21] Appl. No.: 491,372

[22] Filed: May 4, 1983

[30] Foreign Application Priority Data

May 4, 1982 [FR] France .................. 82 07692

[51] Int. Cl.[4] ............................. F02K 3/02
[52] U.S. Cl. ........................ 60/262; 137/601; 251/228
[58] Field of Search ........... 60/226.3, 262; 415/148; 137/601; 251/228; 98/121 A

[56] References Cited

U.S. PATENT DOCUMENTS

| 2,934,895 | 5/1960 | Gregory et al. | |
| 3,147,768 | 9/1964 | Kennedy | 137/601 X |
| 3,426,507 | 2/1969 | Kossowski et al. | 137/601 X |
| 3,592,240 | 7/1971 | Hedrick et al. | 137/601 X |
| 3,771,559 | 11/1973 | Alley | 137/601 |
| 3,972,349 | 8/1976 | Tumavicus | 137/609 |
| 4,065,097 | 12/1977 | Timin | 251/228 |
| 4,184,288 | 1/1980 | Magill et al. | 137/601 X |
| 4,241,647 | 12/1980 | Herr | 137/601 X |
| 4,275,560 | 6/1981 | Wright et al. | 60/226.3 |
| 4,355,953 | 10/1982 | Nelson | 415/211 X |

FOREIGN PATENT DOCUMENTS

| 3029001 | 5/1981 | Fed. Rep. of Germany . |
| 1072779 | 9/1954 | France . |
| 1169823 | 1/1959 | France . |
| 2085470 | 12/1971 | France . |
| 2123831 | 9/1972 | France . |
| 2168035 | 8/1973 | France . |
| 2315664 | 1/1977 | France . |
| 2353776 | 12/1977 | France . |
| 2445438 | 7/1980 | France . |
| 1099677 | 1/1968 | United Kingdom . |

Primary Examiner—Carlton R. Croyle
Assistant Examiner—Jeffrey A. Simenauer
Attorney, Agent, or Firm—Oblon, Fisher, Spivak, McClelland & Maier

[57] ABSTRACT

The control device comprises at least one control ring to which one end of an elbow lever is articulated. The vane pivot of alternating vanes is fixed at the intersection of the arms of the elbow levers. The other end of each elbow lever is connected by a rod to the end of a straight lever, the other end of which is fixed to the pivot of an adjacent vane. The circumferential movement of the ring causes the pivots of the adjacent vanes to pivot in opposite directions. Two other embodiments have two rings.

3 Claims, 11 Drawing Figures

PRESSURE DROP REGULATING DEVICE

BACKGROUND OF THE INVENTION

1. Field of the Invention:

The present invention is directed to a device for regulating the pressure drop of at least one of the flows in a multiflow turbojet engine. The device includes a stage composed of variable-adjustment vanes located in the secondary annular channel surrounding the primary channel, a vane control ring, connection means between the control ring and the vanes and rotation control means of the control ring.

2. Description of the Prior Art

The regulating of the pressure drop of the secondary air flow in a multiflow turbojet is necessary in order to obtain the best possible flight conditions in order to adjust, in a constant manner, the relationship of the outputs of the primary and the secondary flows in the flight conditions encountered. This adjustment of the bypass dilution ratio favors the creation of a homogeneous mixture of the two flows and allows a satisfactory afterburner operation both under conditions of subsonic flight and of supersonic flight.

For example, French Patent No. 995,131 discloses a device which can act on the secondary flow by means of obturator flaps located in the secondary channel and permits the dilution ratio to be reduced without any appreciable change of the rotating speeds of the mechanical components.

French Patent No. 2,445,438 describes a mechanism for actuating obturation vanes in which the vanes are located in the secondary channel and pivot about axes which turn in bearings carried by the inner and outer walls of the secondary channel. The axis crossing the outer wall is fixed to one end of a lever, the other end of which turns in a fork integral with a ring. A jack causes the ring to rotate, thus causing the vanes to rotate and vary the degree of obturation of the channel. The modification of the pressure drop of the channel according to this mechanism is intended to assist in starting with the motor air, to reduce the level of thrust when reducing speed on the ground and to reduce the secondary flow under idling conditions.

SUMMARY OF THE INVENTION

The present invention also has as an object a device for regulating the pressure drop in an engine flow by flaps located in the path of the secondary flow, the inclination of which can be regulated as a function of the flight conditions.

The present invention has a further object of reducing the dilution ratio under flight conditions at a high Mach number, of reducing or stabilizing the flow speed in the secondary downstream flow in order to avoid disturbing the stability of the flame on the flame retention baffles of the afterburning system, and of increasing the upstream pressure in the secondary channel and thus increasing the pressure ratio in the high-pressure compressor in order to facilitate acceleration from a reduced aerodynamic speed to a supersonic speed and so favorably influence the pumping load of the compressor.

Compared to the known systems, the device of the invention has a very simple construction, while avoiding a rotation of the flow. The arrangement of the vanes and the direction of rotation of two adjacent vanes allows a balancing of aerodynamic forces which facilitates the control and use of a space-saving control system.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
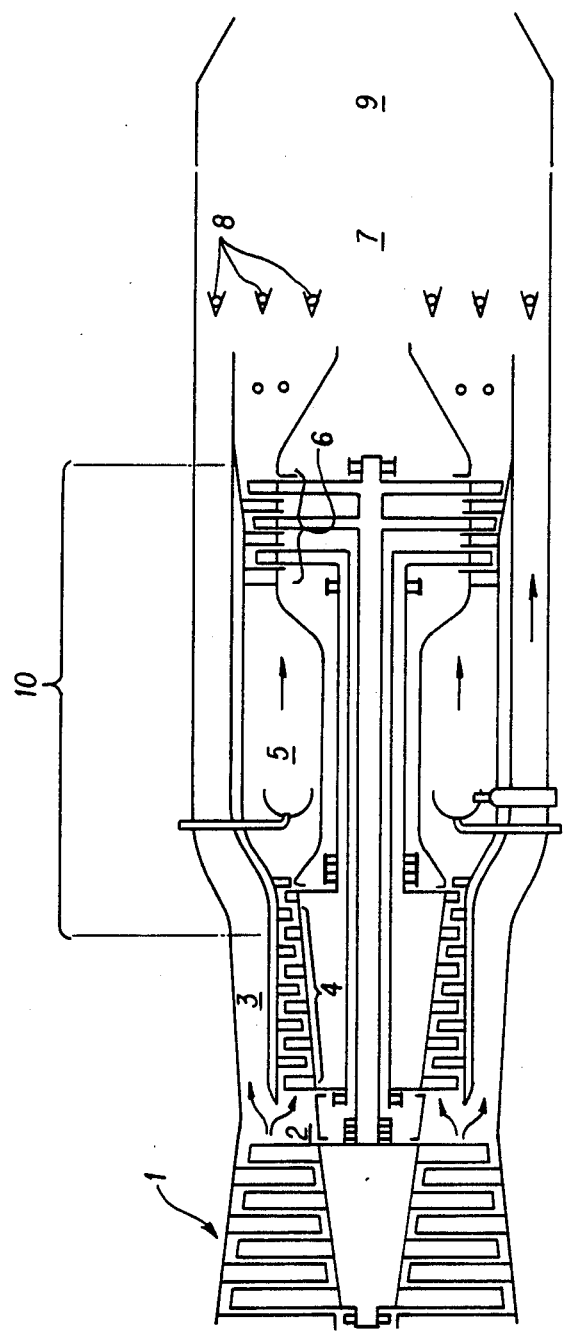
FIG. 1 is a schematic view, in axial section, of a multiflow turbojet showing the zone in which the device of the invention is located.

FIG. 1 is a view, in axial section, of a double-flow turbojet with both post-combustion of fuel behind the turbine and afterburning of the cold flow, which can be fitted with a device for regulating pressure drop in accordance with the invention.

A turbojet classically has a low pressure compressor 1 which supplies a primary channel 2 and a secondary channel 3 with compressed air. The flow in primary channel 2 passes through medium and high-pressure compressor stages 4, combustion chamber 5, high and low-pressure turbines 6, post-combustion chamber 7, in which post-combustion fuel injectors 8 are located, and through exhaust nozzle 9. The flow through secondary channel 3, coaxial to primary channel 2, arrives upstream from certain of the injectors 8 in the post-combustion chamber and allows the homogenization of the combustion gases coming from the primary channel by dilution of the primary flow with the secondary air, and assures an optimum composition of the afterburner mixture and a sufficient dilution of the ejected gases.

In order to obtain these advantages by regulating the pressure drop of the flow of secondary air, the regulating device of the invention should preferably be axially placed in a zone 10 of the secondary channel and extending approximately between the last stage of the high-pressure compressor and the last stage of the low-pressure turbine.

Figure 2:
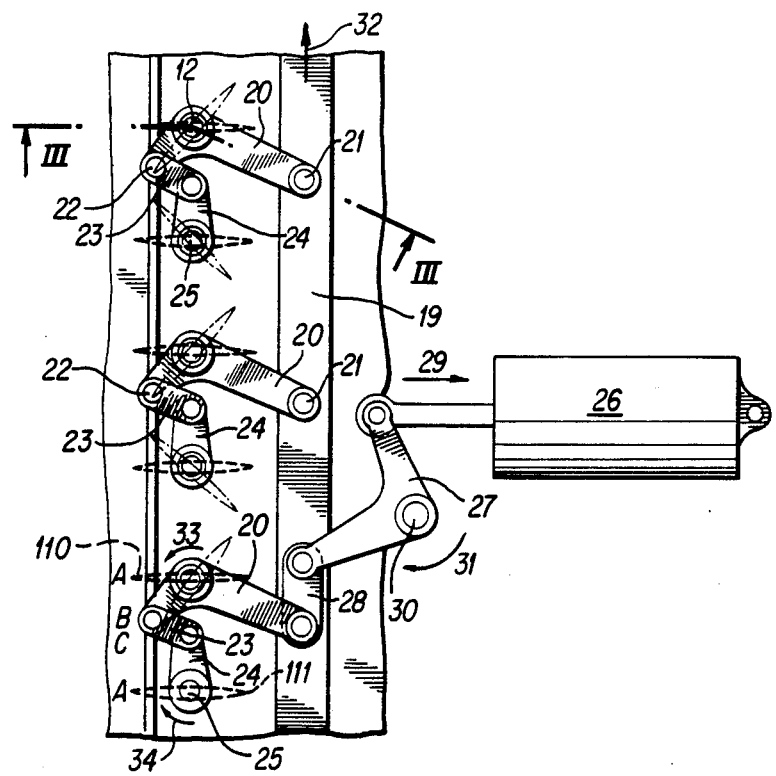
FIG. 2 is a view along line II of FIG. 3, looking radially inward, of a flat circumferential projection of a first embodiment of the regulating device of the invention.
Figure 3:
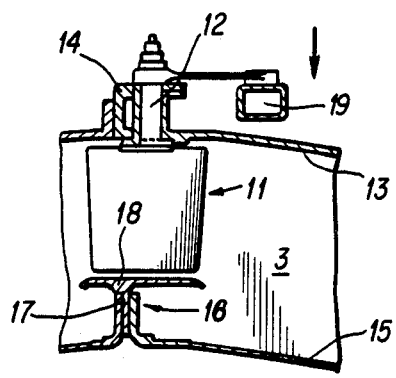
FIG. 3 is a view along line III—III of FIG. 2.

FIGS. 2 and 3 show a first embodiment of a device for regulating the pressure drop of the flow of secondary air viewed in a flat projection and in an axial section, respect- ively.

The device comprises a circumferentially extending stage of variable-adjustment vanes 11.

The vanes are each carried on a pivot 12 extending in the longitudinal axis of symmetry of each vane. Each pivot traverses outer wall 13 of secondary channel 3 through bearing 14. According to an embodiment of the vane shown in FIG. 3, the vane blade does not occupy the entire radial height of the channel. Rather, a portion of the channel is occupied by fixed pressure drop device 16 on the inner wall 15. The fixed pressure drop device 16 is constituted by ring 17 which carries cylindrical collar 18.

Control ring 19, concentric with, and outside of, secondary channel 3, controls the vanes 11 via a set of levers each of which is in the form of an elbow lever 20 with unequal arms, fixed at the intersection of its arms, to pivot 12 of a first vane 110. End 21 of the longer arm is articulated to ring 19 and end 22 of the shorter arm is articulated to one end of rod 23. The other end of rod 23 is articulated to the end of straight lever 24 fixed to pivot 25 of a second vane 11 adjacent to the first vane.

Ring 19 is moved circumferentially by rotation control means constituted, for example, by jack 26, elbow lever 27 and rod 28.

The device operates as follows. The retraction of the jack shaft in the direction of arrow 29 causes elbow lever 27 to rotate about its fixed axis 30 in the direction of arrow 31, causing ring 19 to move circumferentially in the direction of arrow 32. The ring moves the end 21 of each elbow lever 20, which rotates in the direction of arrow 33, moving the blade of vane 110 from position A to position B (for the sake of simplicity, the vanes and their blades are given the same reference numeral).

The end of elbow lever 20 rotates straight lever 24 via rod 23, which lever 24 is fixed to the adjacent vane 111, in the direction of arrow 34, opposite that of elbow lever 20, and moves vane blade 111 from position A to position C. Blades 110 and 111 of each pair of vanes rotate symmetrically in relation to the axial direction, decreasing the passage defined by the edge of the blades, so that the secondary air continues to flow axially whatever the degree of closure, which can go all the way to a complete closure.

Figure 4:
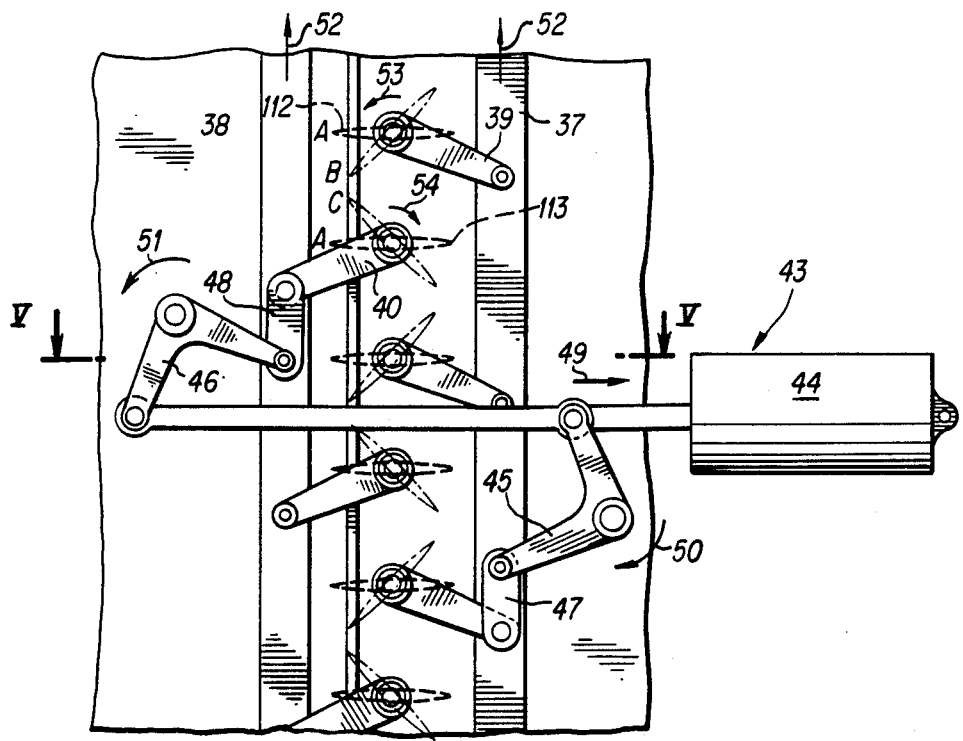
FIG. 4 is a radial view along line IV of FIG. 5 looking radially inward, of a flat circumferential projection of a second embodiment of the regulating device of the invention.
Figure 5:
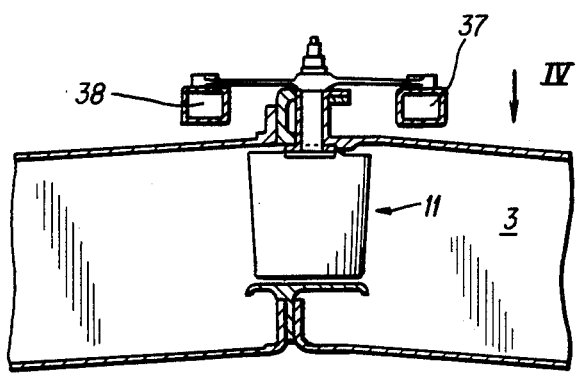
FIG. 5 is a sectional view along line V—V of FIG. 4.
Figure 6:
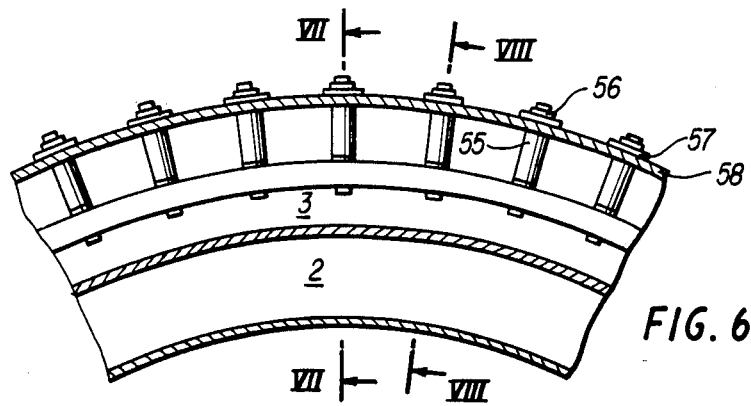
FIG. 6 is a view in radial section along line VI—VI of FIG. 7 of a part of the turbojet showing an array of regulatable vanes according to a third embodiment of the regulating device of the invention.

FIGS. 4 and 5 show a second embodiment of a device according to the invention. The elements corresponding to those of the preceeding embodiment have the same reference numerals.

The device comprises two control rings 37 and 38 concentric with and outside of secondary channel 3. Straight levers 39 and 40 provide a connection between the vane pivots 12 and the rings located axially downstream and upstream from them. One vane 112 of each pair is connected to the first ring 37 and the second vane 113 of each pair is connected to the second ring 38. Straight levers 39 and 40 are respectively fixed by one of their ends to the pivots of vanes 112 and 113, and their other ends are articulated to the rings.

Control device 43 includes a device for longitudinal movement, e.g. a jack 44, and two elbow levers 45 and 46 for the regulating of the orientation of the vanes. One of the ends of elbow levers 45 and 46 is articulated to the jack shaft, and the other end is articulated via rods 47 and 48 of the rings. When the jack shaft moves in the direction of arrow 49, elbow levers 45 and 46 rotate in the direction of arrows 50 and 51, that is, in opposite directions, moving rings 37 and 38 in the direction of arrows 52. Straight levers 39 and 40, fixed to the pivots of vanes 112 and 113, move the vanes in the direction of arrows 53 and 54 so that they pass, for example, from position A to B and A to C, respectively. As in the preceeding embodiment, the vanes move symmetrically in relation to the axial direction of the flow so as to increase or decrease the flow passage for the secondary air without making the flow undergo the axial direction.

FIGS. 6 to 11 shows a third embodiment of the device.

As in the preceeding embodiment, the device is in the form of a circumferentially extending array of variable-adjustment vanes (FIG. 6) located in secondary air channel 3. Vanes 55 carry a pivot 56, the root of which rotates in bearings 57 fixed in the outer wall 58 of channel 3. At least two pivots 561 and 562 (see FIG. 11) traverse and project outside the channel. Their function will be described below in more detail.

The vanes each carry a head pivot 59 or 62 (FIGS. 7 and 8) at the radially inside surface. Each such pivot is eccentric in relation to the longitudinal axis of symmetry of the vane and is placed alternatingly at the downstream or upstream end of the vane in relation to the direction of the secondary air flow to provide mutually alternating first and second vanes. These head pivots 59 or 62 constitute the connection means to two rings 60 and 61 concentric with secondary channel 3 and positioned inside this channel. Bearings 59' or 62' are formed in the rings 60 and 61, respectively, at circumferential distances corresponding to twice the distance separating two vanes, so that two mutually alternating adjacent vanes 551 and 552 are connected, for example, one to upstream ring 60 and one to downstream ring 61.

Figures 7, 8:
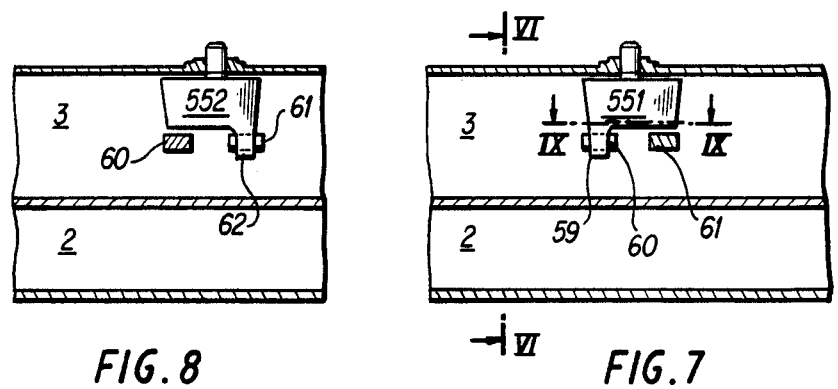
FIGS. 7 and 8 are views along lines VII—VII and VIII—VIII of FIG. 6.

Pivots 561 and 562 projecting outside the secondary channel 3 are connected to control device 70, which, according to the embodiment of FIG. 7, includes two clips 63 extending toward one another and fixed to pivots 561 and 562. A connection part 64 is pivoted between the branches of the clips. This connection part is integral with moving device a jack (of which only a jack rod 64c is shown in FIG. 11) which moves it perpendicularly to its longitudinal axis.

Figure 11:
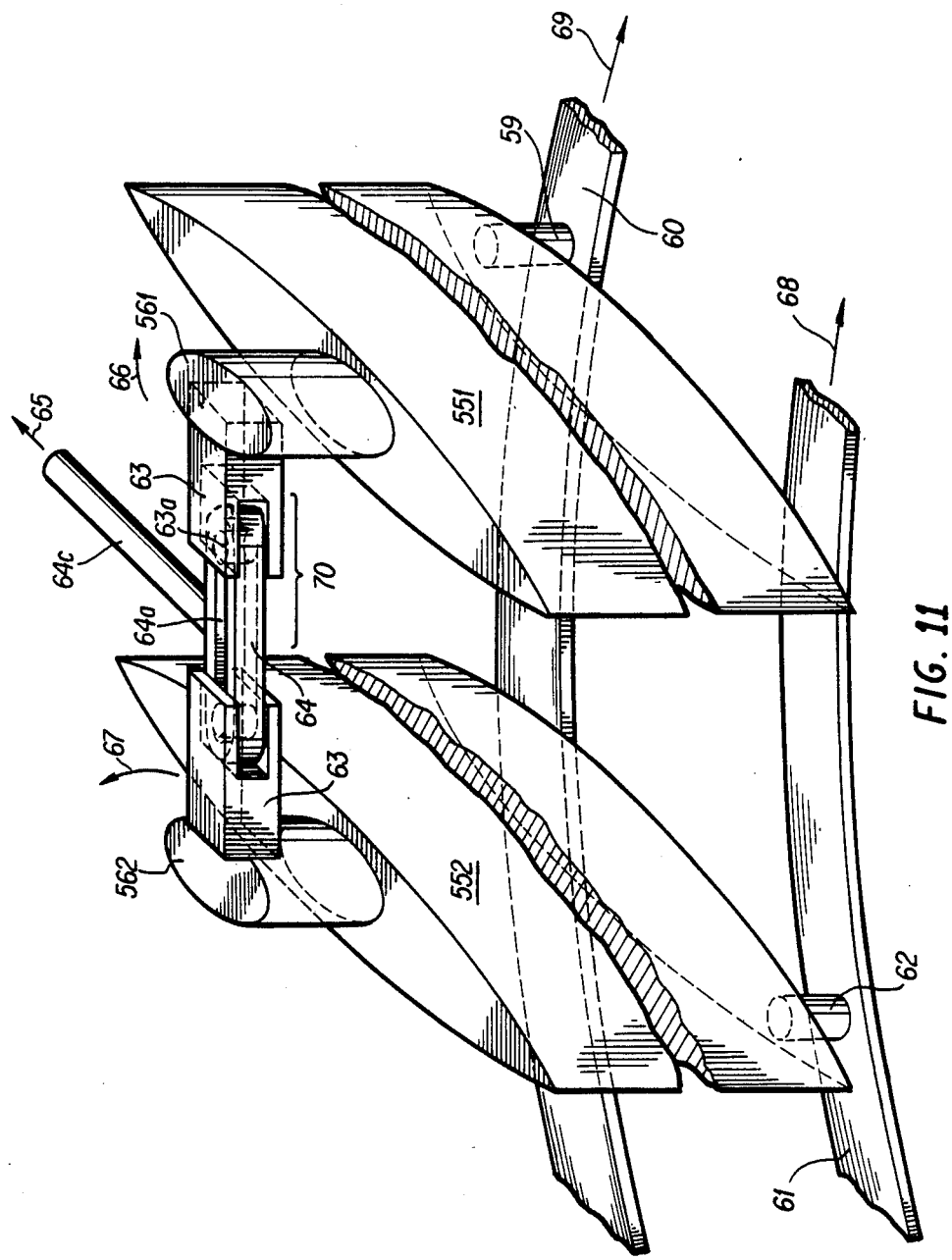
FIG. 11 is a perspective view of the device of FIGS. 6 to 10.

The upper part and the lower part of clip 63 are connected by a pivot shaft 63a (whose reference number is shown in FIG. 11 for more clarity) fixed to clip 63. The ends of connection part 64 slide between the branches of clip 63, and so pivot shaft 63a is movable only in a direction perpendicular to jack rod 64c in a central recess 64a of connection part 64 which constitutes a slide.

Figures 9, 10:
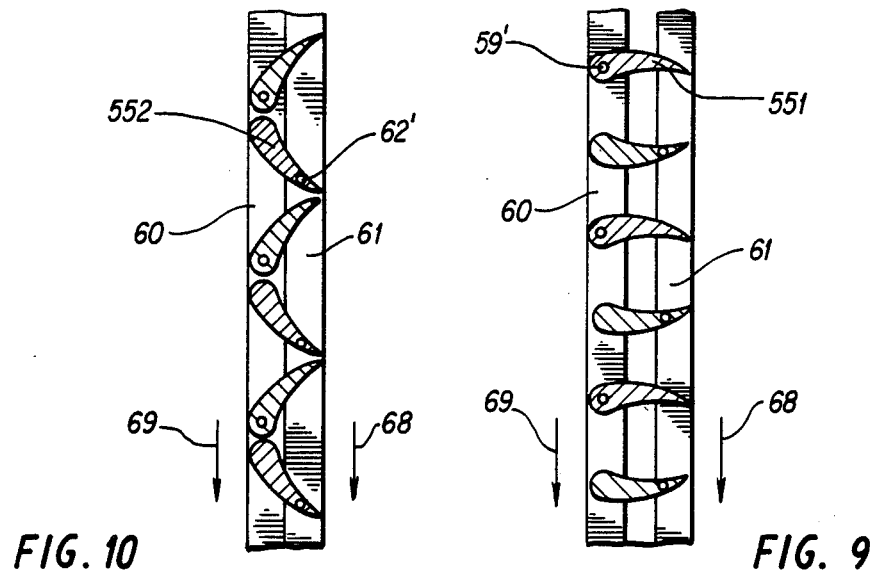
FIGS. 9 and 10 are views along line IX—IX of FIG. 7 for the vanes in "open" and in "closed" position, respectively.

When connection part 64 is moved in the direction of arrow 65, (i.e., in the direction of the engine longitudinal axis) pivots 561 and 562 are rotated in the direction of arrows 66 and 67. The air foil portion of the two vanes 551 and 552 rotate in opposite directions and head pivots 59 and 62 move rings 60 and 61 in the same direction, as is shown by arrows 68 and 69, and consequently bring about the rotation of all the vanes in the array. FIG. 9 shows the device when the vanes are in "open" position, whereby the planes of the blades are parallel to the direction of the secondary air flow. FIG. 10 shows the device in "closed" position, whereby the ends of the air foil portions lie against each other. The movement from the "open" position to the "closed" position is performed, as in the preceeding embodiments, by symmetric rotation of the vanes in relation to the axial direction. An opposite rotation of two adjacent vanes decreases the passage between the blades, so that the secondary air flow continues to flow axially until complete closure.

In the embodiment of FIGS. 6 to 11 it should be noted that, contrary to the prior art and to the embodiments of FIGS. 1 to. 5, the space required by the system for adjusting the dilution ratio is very small outside of the channel 3, since the control rings are in the secondary flow itself. The additional outer space required, as compared to a system without adjustment of the bypass ratio, is limited to that necessary for the control jack, which can be placed peripherally, e.g., in an area where the slight additional space required does not cause a problem. Although it is not shown, a fixed pressure drop device could also be positioned in channel 3.

It is apparent in all the embodiments, given as nonlimiting examples, that the pressure drop and thus the bypass ratio can be modulated in a continuous and progressive manner as a function of the flight conditions or of the pressure of the turbojet. This modulation can be varied from a very small pressure drop (corresponding to the drag of the feathered vanes, to which is added in the embodiment of FIGS. 6 to 11 the drag of the two rings 60 and 61, wherein the latter is in the wake of the first) to a large pressure drop, or even to the complete obstruction of the channel 3.

Finally, in all the embodiments, described as nonlimiting examples, as the axes of rotation of the vanes are located approximately in the middle of the chord of the vanes, the control forces are relatively small and the continuous variation of the dilution rate is performed without causing the secondary flow to rotate about its axis, and even when there is residual rotation behind compressor 1 the system functions partially as a straightener stage, whatever its position. The obtaining of a secondary flow without rotation is important for improving the functioning of the heating of the cold flow.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a multiflow turbojet engine having a primary gas flow channel and a secondary gas flow channel coaxially surrounding said primary flow channel, a device for regulating a pressure drop of a gas flow in at least one of the channels, said device comprising:
    a plurality of pivotable vanes in at least one of said channels;
    two control rings;
    connection means connected between said control rings and said vanes, said connection means comprising means responsive to rotation of said at least control ring and respectively connecting first and second control rings to first and second ones of said vanes, for pivoting said first ones of said vanes in a first rotational sense and said second ones of said vanes in a second rotational sense opposite said first rotational sense, said first and second vanes being mutually alternating in position; and
    means for moving said at least one control ring, wherein each said vane includes a first pivot extending through a radially outer wall of said second flow channel, wherein said control rings are in, and concentric with, said secondary channel, one of said control rings being at either axial end of said vanes, and wherein said connection means further comprise a second pivot on one axial end of each said first vane and journalled in said first control ring, and a third pivot on an opposite axial end of each said second vane and journalled in said second control ring, and wherein said means for moving are connected to said first pivot of only two adjacent vanes.

2. The device of claim 1 wherein said means for moving comprise:
    a clip fixed to each said first pivot at a position radially outside of said radially outer wall;
    a connector part having ends pivoted to clips of adjoining pairs of said first and second vanes; and
    means for moving said connector piece in the direction of the axis of said engine.

3. The device of claim 1 wherein a radial height of said vanes is less than a radial height of said secondary channel.

* * * * *

UNITED STATES PATENT AND TRADEMARK OFFICE
CERTIFICATE OF CORRECTION

PATENT NO. : 4,546,606

DATED : OCTOBER 15, 1985

INVENTOR(S) : JEAN G. BOUILLER

It is certified that error appears in the above-identified patent and that said Letters Patent is hereby corrected as shown below:

Column 3, line 2, change "respect-ively" to --respectively--.

Column 4, line 8, after "undergo" insert --a deviation from--.

Column 4, line 24, change "mutally" to --mutually--.

Column 4, line 40, after "with" insert --a--.

Column 6, line 23, change "second" to --secondary--.

Signed and Sealed this

Eleventh Day of February 1986

[SEAL]

Attest:

DONALD J. QUIGG

Attesting Officer

Commissioner of Patents and Trademarks